Nov. 30, 1971     A. P. PARDUHN     3,623,286

BREAKAWAY POST

Filed Sept. 19, 1969

INVENTOR.
ALFRED P. PARDUHN
BY
ATTORNEY

United States Patent Office 3,623,286
Patented Nov. 30, 1971

3,623,286
BREAKAWAY POST
Alfred P. Parduhn, 1924 Plymouth Lane,
Oklahoma City, Okla. 73120
Filed Sept. 19, 1969, Ser. No. 859,296
Int. Cl. E01f 9/01; E04c 3/32
U.S. Cl. 52—98
9 Claims

ABSTRACT OF THE DISCLOSURE

A breakaway post for delineating the presence or boundary of a hazard which post embodies a shearing member having at least a pair of breakaway pillars.

BACKGROUND OF THE INVENTION

This invention relates to safety devices for delineating the presence or boundary of a hazard and more particularly to posts which are provided with a predetermined breaking zone a distance from its post supporting end.

FIELD OF THE INVENTION

This invention is particularly directed to a breakaway post embodying a shearing member which is fitted into a foundation or rigid supporting socket member. The shearing member provides a predetermined breaking zone and may be formed from cast iron, aluminum or any other suitable material. A post is positioned over the upper end of the shearing member. When an object such as a motor vehicle collides with the breakaway post the shearing member comprising a portion of reduced diameter constituting the predetermined breaking zone will shear off at a given impact force, thereby reducing or retarding the speed of the colloding motor vehicle.

DESCRIPTION OF THE PRIOR ART

At the present time breakaway posts embodying shearing members or pins have been used in safety fences for preventing motor vehicles from leaving the road but the strength and the elongation at fracture of the shearing pin of this type of breakaway post has either collapsed too easily or been non-directional in its effect on the direction of travel of the colliding vehicle.

One of the significant contributions of this invention is that the new and improved breakaway post embodies a shearing member which may be manufactured to various specifications having similar configuration thereby providing breakaway pole structures which will stand various shearing forces while all retaining the same outside geometrical configuration.

SUMMARY OF THE INVENTION

In accordance with the invention claimed a new and improved breakaway post is provided which utilizes a shearing member having a weakened section arranged between its ends comprising at least a pair of breakaway pillars. The pillars are laterally spaced from each other and from the axis of the post and may have similar or different diameters and be of similar or different outward configuration.

It is, therefore, one object of this invention to provide an improved breakaway post for delineating the presence or boundary of a hazard.

Another object of this invention is to provide an improved breakaway post embodying a shearing member comprising at least a pair of breakaway pillars.

A further object of this invention is to provide an improved breakaway post embodying a shearing member having a weakened section between its end comprising a plurality of breakaway pillars all having substantially similar cross sectional configurations.

A still further object of this invention is to provide an improved breakaway post embodying a shearing member having a weakened section between its ends comprising a plurality of pillars the cross sections of which have at least two different diameters.

A still further object of this invention is to provide an improved breakaway post which is economical to manufacture and repeatedly rebuildable after each collision with a minimum of expense an deffort.

Further objects and advantages of the invention will become apparent as the following description proceeds and the features of novelty which characterizes this invention will be pointed out with particularity in the claims annexed to and forming part of this specification.

BRIEF DESCRIPTION OF THE DRAWING

The present invention may be more readily described by reference to the accompanying drawing in which.

DESCRIPTION OF PREFERRED EMBODIMENT

Figure 1:
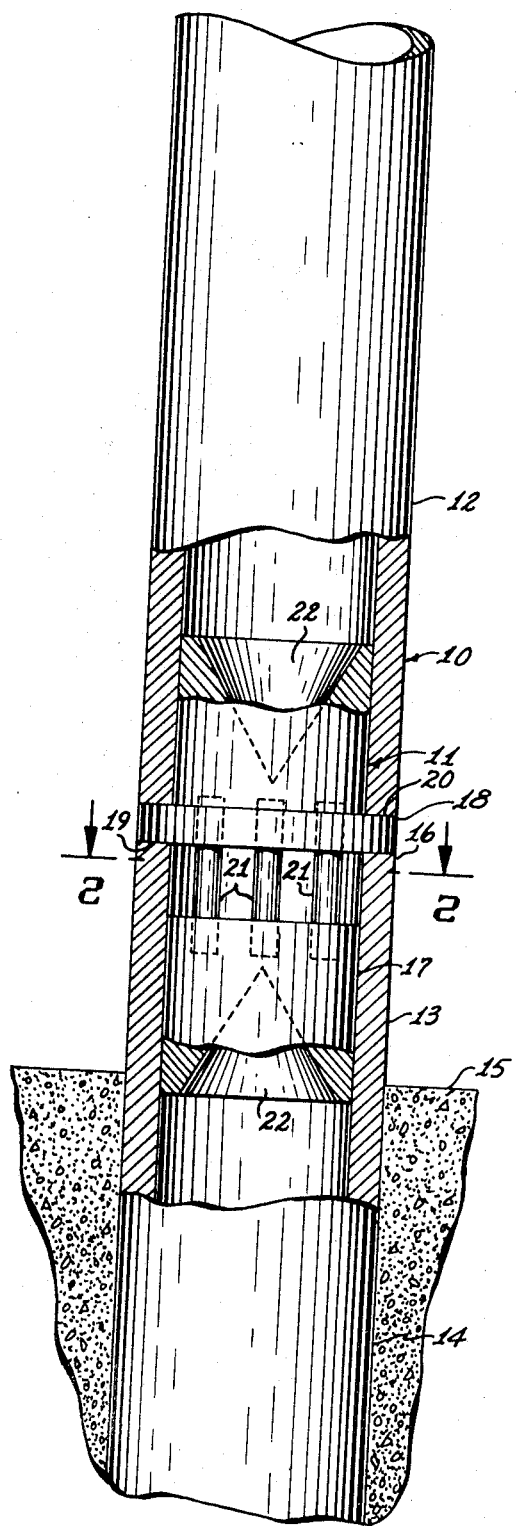
FIG. 1 is partial vertical sectional view of the breakaway post and embodying the invention.
Figure 2:
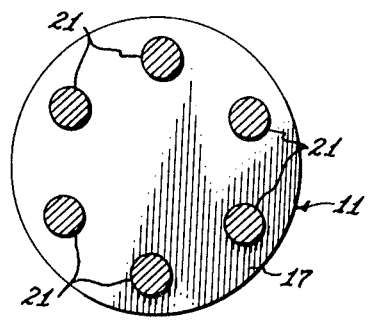
FIG. 2 is a cross section view of the structure shown in FIG. 1 taken along the line 2—2.

Referring more particularly to the drawing by characters of reference, FIGS. 1 and 2 disclose a breakaway post 10 for delineating the presence or boundary of a hazzard. Post 10 comprises a shearing member 11 interconnecting a post portion 12 and socket portion 13 of the post structure. The socket portion 13 has its lower end 14 firmly held, for example, in concrete 15. Although concrete 15 is shown as extending around only the lower end of socket 13 it may extend to the upper end 16 of the socket, if so desired. The upper end 16 of socket portion 13 is hollow for receiving lower end 17 of shearing member 11. Shearing member 11 is provided with a collar 18 between the axial ends of its structure which has a diameter larger than the respective diameters of the upper and lower ends of the socket portion 13 and post portion 12, respectively. The lower surface 19 of collar 18 forms an annular surface which abuts against the upper surface of end 16 of socket portion 13 and an upper annular face 20 supporting post 12. This arrangement establishes a simple structure which any be easily assembled and repeatably rebuilt each time the shearing member 11 collapses upon impact.

As can be seen from FIGS. 1 and 2, the shearing member 11 has a reduced portion between its ends which constitutes a predetermined breaking zone. In this disclosure this reduced portion comprises a plurality of pillars 21 ararnged substantially parallel with but laterally spaced from the longitudinal axis of breakaway post 10 and in a circle within the circumference of the shearing member. Each shearing pin, collar or pillar 21 as shown in FIGS. 1 and 2 has substantially the same diameter and shearing force characteristics.

The shearing member 11 including its pillars 21 may be cast in one piece and provided with recesses 22 at one or both ends to save materials. It is also within the scope of this invention to provide a shearing member wherein the shearing pins or pillars 21 may be formed separately and of different material from the rest of the shearing member and then inserted in the shearing member to form a unitary structure. Thus, the shearing member could be rebuildable after each collision, if desired, although it is believed to be more practical to form the shearing member 11 including pillars 21 as a single piece of material and replace the shearing member each time post 10 is rebuilt. Even though the pillars of the shearing member 11 are shown as cylindrical members having the same cross section throughout their lengths they could be frustums of cones or prisms. It is intended that the term pillars as used in the specification and claims includes all of the known pillar type geometrical configurations.

Figure 3:
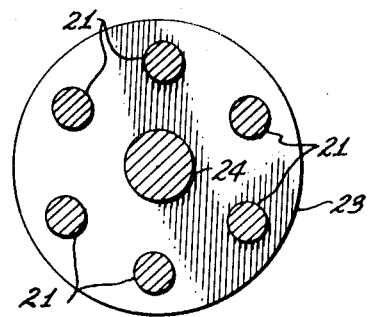
FIG. 3 is a view similar to FIG. 2 of a modification of the shearing member shown in FIG. 1.

FIG. 3 is a modification of the shearing member shown in FIGS. 1 and 2 wherein shearing member 23 comprises the same type of structure as shown in FIGS. 1 and 2 with the exception that an additional larger diameter pillar 24 is arranged to extend along the axis of the shearing member and the breakaway post structure. This added pillar, as showing in a cross sectional view in FIG. 3 is arranged along the axis of the shearing member causing the breakaway post to withstand a larger impact force before collapsing than the structure shown in FIGS. 1 and 2.

Figure 4:
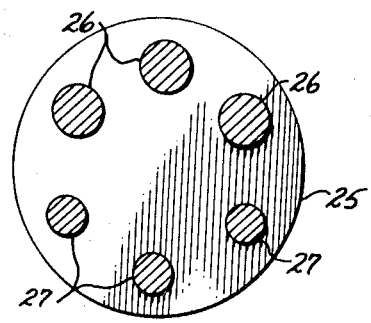
FIG. 4 is another view similar to FIGS. 2 and 3 of a further modification of the shearing member shown in FIG. 1.

FIG. 4 illustrates a further modification of the shearing member 11 of FIGS. 1, 2 and 3 wherein shearing member 25 comprises the same type of structure as shown in FIGS. 1–3 except that the pillars of shearing member 11 are replaced with pillars 26 and pillars 27 of two different diameters. As noted, pillars 26 are arranged along one arcuate portion of the circumference of shearing member 25 while pillars 27 are arranged along another arcuate portion of shearing member 25. By arranging the smaller diameter pillars 26 in the path of a colliding vehicle in the breakaway post, the post will tend to control the direction of movement of the colliding vehicle. This is believed to occur, if the force of collision is not of such force as to cause immediate collapse of all of the pillars, because the smaller diameter pillars should collapse first followed by the larger diameter pillars, thereby providing a sequence of momentary delays to the forward movement of the colliding vehicle in a given direction. The resistance to rupture and the breaking elongation of the shearing pillar material are important. Cast iron as a shearing pin or pillar material is recommended because its rupture and elongation characteristics can be determined with sufficient accuracy and will not change in time by atmospheric influences. Satisfactory pillars may be formed from a gray cast iron containing lamellary graphite. Although gray cast iron may be used since it has a desirable brittleness, pearlite iron with a nickel additive for increasing elongation at fracture may also be used. Aluminum or any other suitable material also may be used for manufacturing the shearing member.

Since the pillars in a given post structure may be of similar or different materials a user may dimension the size of the pillars and vary their materials so as to attempt to control the movement of a colliding vehicle. For example, a fence of breakaway posts may contain posts having shearing pins of progressively larger diameter in the direction of movement of a colliding vehicle, thereby sequentially placing a stronger and stronger obstacle in the path of movement of the colliding vehicle to gradually reduce its forward motion.

A particular advantage of the shearing members disclosed are that they can be replaced in a simple manner. The collar of the shearing member forms a satisfactory transition from the socket portion 13 to the post portion 12 in that there are no projecting parts that might constitute a danger in an accident. Due to the fact that the socket portion 13 is closed by the lower annular face 19 of collar 18, water is prevented from entering the socket portion of the breakaway post.

Although but a few embodiments of the present invention have been illustrated and described, it will be apparent to those skilled in the art that various changes and modifications may be made therein without departing from the spirit of the invention or from the scope of the appended claims.

What I claim is:

1. A breakaway post structure comprising a socket portion and an axially arranged cooperating post portion, each portion being provided with a bore extending through at least a part of its length, a shearing member within the bore of each portion connecting said portions into a functionally rigid member, said shearing member having a weakened section between its ends comprising a plurality of horizontally spaced, substantially parallel, individual breakaway pillars, said pillars bridging said portions to form said rigid member, and extending substantially parallel to, the central longitudinal axis of said breakaway post structure, at least two of said pillars being spaced radially outwardly from said central longitudinal axis.

2. The combination set forth in claim 1 wherein at least one of said pillars has a different cross sectional area than the cross sectional areas of the other of said pillars.

3. The combination set forth in claim 1 wherein said pillars are of substantially the same cross sectional area.

4. The combination set forth in claim 1 wherein at least one of said pillars has a different shear strength than the other of said pillars.

5. The combination set forth in claim 1 wherein said shearing member has a collar between its ends which overlies the juxtapositioned ends of said socket and post portions, said collar separating said socket and post portions a predetermined distance.

6. The combination set forth in claim 1 wherein said shearing member comprises a plurality of pillars wherein part of said pillars having a given diameter are arranged along a given arcuate portion of said shearing member and another part of said pillars having a different diameter are arranged along a different arcuate portion of said shearing member.

7. The combination set forth in claim 1 wherein said shearing member comprises a plurality of pillars equally spaced within the outer periphery of said shearing member.

8. The combination set forth in claim 7 in further combination with a pillar of larger diameter than said plurality of pillars arranged along the axis of said shearing member.

9. A breakaway post structure comprising:
  a tubular socket having a bore extending through at least a part of its length;
  a tubular post having a bore extending through at least a part of its length and arranged in axial alignment with said socket for cooperation therewith;
  a shearing member having an upper end portion projecting into the bore in said post and a lower end portion projecting into the bore in said socket for rigidly interconnecting said socket and post into a functionally rigid member, said shearing member further including:
    a collar secured to one of the end portions of said shearing member on the side thereof nearest adjacent the other end portion of said shearing member, and extending in a horizontal plane projecting substantially normal to the longitudinal axis of said breakaway post, said collar extending between the adjacent facing ends of said socket and post and separating said socket and post; and
    a plurality of individual breakaway pillars extending between and interconnecting said collar and the upper end portion of said shearing member with the lower end portion thereof, said pillars being elongated and generally cylindrical in form, and being horizontally spaced and extending substantially parallel to each other and to the longitudinal axis of said breakaway post, said pillars each further being susceptible to shearing under the impact of a force acting in a plane normal to the longitudinal axis of the respective elongated pillar.

References Cited

UNITED STATES PATENTS

| 3,521,413 | 7/1970 | Scott et al. | 52—98 |
| 1,499,445 | 7/1924 | Clay | 52—98 |
| 3,307,833 | 3/1967 | Müller | 94—1.5 |
| 3,331,397 | 7/1967 | Müller | 285—2 |
| 3,349,531 | 10/1967 | Watson | 52—98 |
| 3,381,427 | 5/1968 | Watson | 52—98 |

FRANK L. ABBOTT, Primary Examiner

L. A. BRAUN, Assistant Examiner

U.S. Cl. X.R.

52—99, 296; 94—1.5; 285—2